United States Patent
Huang (10) Patent No.: US 9,789,528 B2
(45) Date of Patent: Oct. 17, 2017

(54) AUTOMATED FORMING MACHINE

(71) Applicant: Po Ming Huang, Taichung (TW)

(72) Inventor: Po Ming Huang, Taichung (TW)

( * ) Notice: Subject to any disclaimer, the term of this patent is extended or adjusted under 35 U.S.C. 154(b) by 281 days.

(21) Appl. No.: 14/822,900

(22) Filed: Aug. 11, 2015

(65) Prior Publication Data

US 2017/0043387 A1    Feb. 16, 2017

(51) Int. Cl.
| | | |
|---|---|---|
| *B21D 37/16* | (2006.01) | |
| *B21D 26/021* | (2011.01) | |
| *B21D 43/02* | (2006.01) | |
| *B29C 49/42* | (2006.01) | |
| *B21D 43/13* | (2006.01) | |

(52) U.S. Cl.
CPC ........... *B21D 26/021* (2013.01); *B21D 37/16* (2013.01); *B21D 43/026* (2013.01); *B21D 43/027* (2013.01); *B21D 43/13* (2013.01); *B29C 49/4205* (2013.01)

(58) Field of Classification Search
CPC .... B21D 26/021; B21D 26/027; B21D 37/16; B21D 43/02; B21D 43/026; B21D 43/027; B21D 43/13; B29C 49/06; B29C 49/4205; B29C 49/6409; B29C 2049/283; B29C 2049/325; B29C 49/66; B29C 49/70
See application file for complete search history.

(56) References Cited

U.S. PATENT DOCUMENTS

| | | | | |
|---|---|---|---|---|
| 7,284,402 B2* | 10/2007 | Friedman | ............. | B21D 26/055 425/526 |
| 8,065,899 B2* | 11/2011 | Frustie | ................. | B21D 26/055 72/342.8 |
| 8,245,554 B2* | 8/2012 | Thonig | .................. | B21D 43/13 72/362 |
| 9,314,832 B2* | 4/2016 | Huang | ................. | B21D 26/021 |
| 9,682,414 B2* | 6/2017 | Ichioka | ................ | B21D 43/003 |

* cited by examiner

*Primary Examiner* — Edward Tolan (57) ABSTRACT

An automated forming machine is adapted to form at least one metal sheet and contains: a material supplying zone, a heating zone, a forming zone, and a cooling zone which are all configured to accommodate components of the automated forming machine. The automated forming machine includes: a frame and a forming device for clamping, heating, and blow molding the at least one metal sheet. The automated forming machine also includes plural tracks, plural loading carriers, a first pushing devices, a second pushing device, a third pushing device, a fourth pushing device, a pulling device, a first heating device and two cooling devices, and each cooling device includes a support rack and a plurality of spray nozzles.

10 Claims, 15 Drawing Sheets

AUTOMATED FORMING MACHINE

FIELD OF THE INVENTION

The present invention relates to an automated forming machine which remove at least one metal sheet from the at least one module quickly.

BACKGROUND OF THE INVENTION

A conventional sheet molding device is disclosed in TW M447804 to mold a metal sheet, and after molding the metal sheet, a molding part and the metal sheet are moved into a cooling groove, such that temperatures of the molding part and the metal sheet are reduced to cool and remove the metal sheet. However, such a cooling and removing process takes a long time.

In addition, the metal sheet is placed on a top surface of the molding part, and the molding part and a sealing part clamp the metal sheet so that the metal sheet is heated and blow molded. Unfortunately, the metal sheet is melted easily, because a high temperature occurs and the molding part and the sealing part clamp the metal sheet forcefully, so the melted metal sheet penetrates into orifices on the top surface of the molding part, and the metal sheet adheres with the molding part securely and cannot be removed.

The present invention has arisen to mitigate and/or obviate the afore-described disadvantages.

SUMMARY OF THE INVENTION

The primary object of the present invention is to provide an automated forming machine in which the at least one metal sheet is fed, preheated, formed, cooled, and taken out automatically to enhance forming efficiency.

Further object of the present invention is to provide an automated forming machine in which the plural loading carriers are heated and cooled upwardly and downwardly to accelerate heating and cooling time, and the plurality of spray nozzles are fixed on the support rack and spray the cooling air, the cooling mist or the coolant to the at least one metal sheet on the plural loading carriers, such that the at least one metal sheet removes from the at least one module quickly.

To obtain the above objects, an automated forming machine provided by the present invention contains: a material supplying zone, a heating zone, a forming zone, and a cooling zone which are all configured to accommodate components of the automated forming machine, wherein the components of the automated forming machine includes:

a frame configured in the material supplying zone, the heating zone and the cooling zone;

a forming device disposed in the forming zone to clamp, heat, and blow mold the at least one metal sheet;

plural tracks configured on the frame and the forming device in a quadrilateral arrangement;

plural loading carriers loading at least one module on which the at least one metal sheet is fixed, such that the plural loading carriers deliver the at least one module and the at least one metal sheet along the plural tracks in a quadrilateral carrying path;

each of a first pushing devices, a second pushing device, a third pushing device and a fourth pushing device mounted in each of four first dies of the material supplying zone, the heating zone, the forming zone and the cooling zone to push the plural loading carrier toward any one of the material supplying zone, the heating zone, the forming zone, and the cooling zone;

a pulling device arranged on a second end of the forming zone and disposed on the forming device, such that the plural loading carriers are pushed by the second pushing device toward the forming zone and are pulled toward a forming position of the forming device;

a first heating device mounted in the heating zone and located above the plural tracks, such that the plural loading carriers move across a bottom of the first heating device, and the at least one metal sheet on the plural loading carriers is heat to the desired temperature;

two cooling devices secured in the cooling zone, and each cooling device including a support rack and a plurality of spray nozzles, wherein the support rack is coupled with the frame and extends to a top of each of the plural tracks, the plurality of spray nozzles are fixed on the support rack and spray cooling air, cooling mist or coolant to the at least one metal sheet on the plural loading carriers, such that the at least one metal sheet removes from the at least one module quickly.

DETAILED DESCRIPTION OF THE PREFERRED EMBODIMENTS

With reference to FIGS. 1 to 7, an automated forming machine according to a preferred embodiment of the present invention is adapted to form at least one metal sheet and comprises: a material supplying zone 1, a heating zone 2, a forming zone 3, and a cooling zone 4 which are all configured in a quadrilateral arrangement to accommodate the automated forming machine. The automated forming machine includes a frame 10, a forming device 20, plural tracks 30, plural loading carriers 40, four pushing devices 50, a pulling device 60, a first heating device 70, two cooling devices 80, a plurality of second heating devices 90, and a plurality of second cooling devices 93.

The material supplying zone 1 accommodates two of the plural loading carriers 40 so that the at least one metal sheet is taken out and is placed. The heating zone 2 accommodates three of the plural loading carriers 40 and heats the at least one metal sheet to a desired temperature. The forming zone 3 accommodates one of the plural loading carriers 40 and clamps, heats, and blow molds the at least one metal sheet. The cooling zone 4 accommodates the two loading carriers 40 and cools the at least one metal sheet.

The frame 10 is configured in the material supplying zone 1, the heating zone 2 and the cooling zone 4.

The forming device 20 is disposed in the forming zone 3 to clamp, heat, and blow mold the at least one metal sheet.

The plural tracks 30 are configured on the frame 10 and the forming device 20 in a quadrilateral arrangement.

The plural loading carriers 40 load at least one module (not shown) on which the at least one metal sheet is fixed, such that the plural loading carriers deliver the at least one module and the at least one metal sheet along the plural tracks 30 in a quadrilateral carrying path.

Each of a first pushing devices 50a, a second pushing device 50b, a third pushing device 50c and a fourth pushing device 50c is mounted in each of four first dies of the material supplying zone 1, the heating zone 2, the forming zone 3 and the cooling zone 4, wherein the first pushing device 50a, the second pushing device 50b, and the fourth pushing device 50d are mounted on the frame 10, and the third pushing device 50c is fixed on the forming device 20. The first pushing device 50a pushes the plural loading carriers 40 toward the heating zone 2 from the material supplying zone 1, the second pushing device 50b pushes the plural loading carriers 40 toward the forming zone 3 from the heating zone 2, the third pushing device 50c pushes the plural loading carriers 40 toward the cooling zone 4 from the forming device 3, and the fourth pushing device 50d pushes the plural loading carriers 40 toward the material supplying zone 1 from the cooling zone 4.

The pulling device 60 is arranged on a second end of the forming zone 3 and is disposed on the forming device 20, such that the plural loading carriers 40 are pushed by the second pushing device 50b to move toward the forming zone 3 and are pulled toward a forming position of the forming device 20.

The first heating device 70 is mounted in the heating zone 2 and is located above the plural tracks 30, such that the plural loading carriers 40 move across a bottom of the first heating device 70, and the at least one metal sheet on the plural loading carriers 40 is heat to the desired temperature.

The two cooling devices 80 are secured in the cooling zone 4, and each cooling device 80 includes a support rack 81 and a plurality of spray nozzles 82, wherein the support rack 81 is coupled with the frame 10 and extends to a top of each of the plural tracks 30, the plurality of spray nozzles 82 are fixed on the support rack 81 and spray cooling air, cooling mist or coolant to the at least one metal sheet on the plural loading carriers 40, such that the at least one metal sheet removes from the at least one module quickly. The two cooling devices 80 cool the at least one module in two stages to accelerate module removal and to produce at least one finished metal sheet.

The plurality of second heating devices 90 are disposed in the heating zone 2 and on the frame 10, and they are located below the plural tracks 30, such that the plural loading carriers 40 move across the plurality of second heating devices 90, and the at least one module on the plurality of second heating devices 90 is heated by the plurality of second heating devices 90, hence the at least one metal sheet on the plural loading carriers 40 is heat by the plurality of second heating devices 90.

The plurality of second cooling devices 93 are disposed in the cooling device 4 and the material supplying zone 1 and on the frame 10, wherein they are located below the plural tracks 30, such that the at least one module on the plural loading carriers 40 is cooled to indirectly cool the at least one metal sheet on the plural loading carriers 40.

Figure 8:
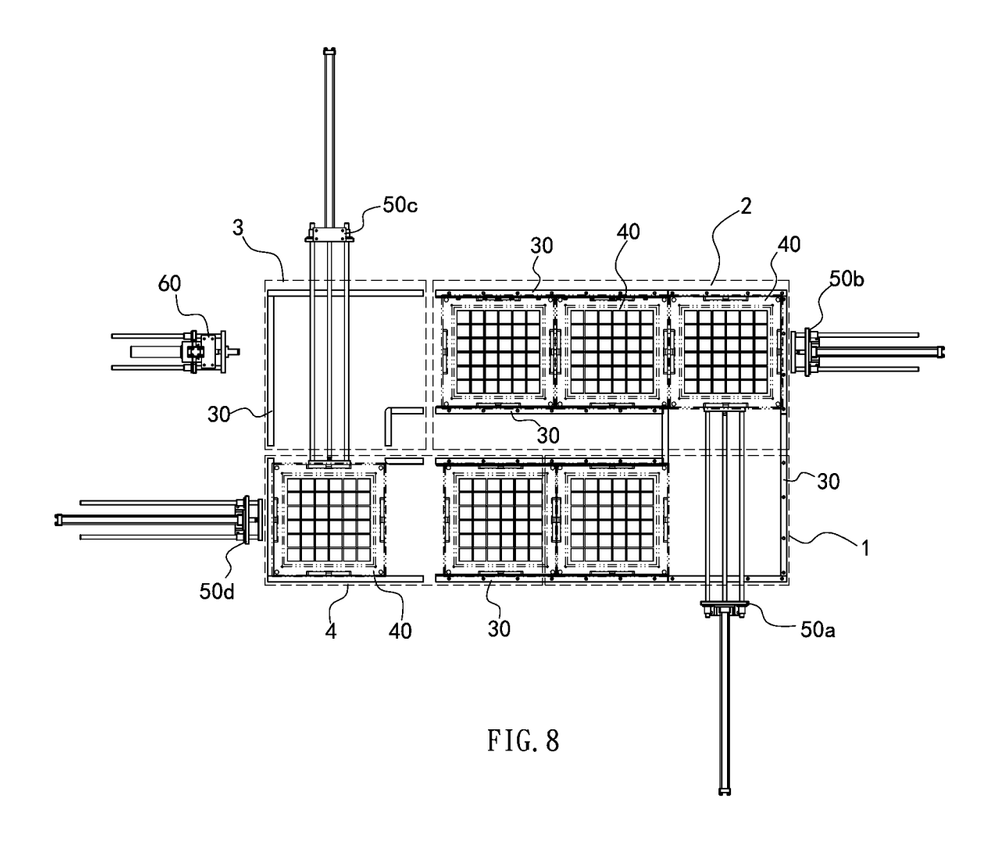
FIGS. 8 to 10 are a top plan view showing the operation of a part of the automated forming machine according to the preferred embodiment of the present invention.

Referring to FIG. 8, the first pushing device 50a pushes the plural loading carriers 40 on a distal end of the material supplying zone 1 toward a front end of the heating zone 2, and the third pushing device 50c pushes the plural loading carriers 40 in the forming device 20 toward a front end of the cooling zone 4 and in one of the two cooling devices 80.

Figure 9:
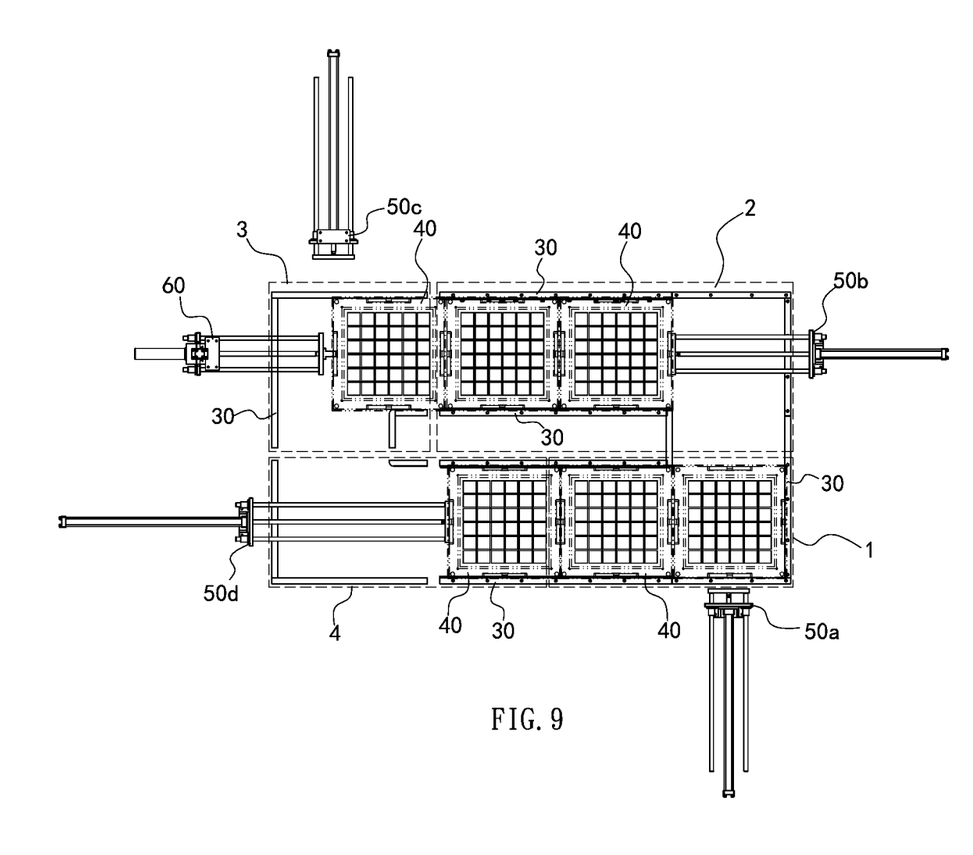

As shown in FIG. 9, the third pushing device 50c pushes the plural loading carriers 40 on a front end of the heating zone 2 toward the forming zone 3, and the plural loading carriers 40 in the heating zone 2 are pushed by one another, such that the plural loading carriers 40 on a distal of the heating zone 2 are pushed out of the heating zone 2 and enter the forming device 3. The third pushing device 50d pushes the plural loading carriers 40 on a front end of the cooling zone 4 toward the material supplying zone 1, hence the plural loading carriers 40 on a front end of the cooling zone 4 move toward a distal end of the cooling zone 4 and are located in the other of the two cooling devices 80. The plural loading carriers 40 on a distal end of the cooling zone 4 are pushed toward a front end of the material supplying zone 1, and the plural loading carriers 40 on a front end of the cooling zone 1 are pushed toward a distal end of the material supplying zone 1.

Figure 10:
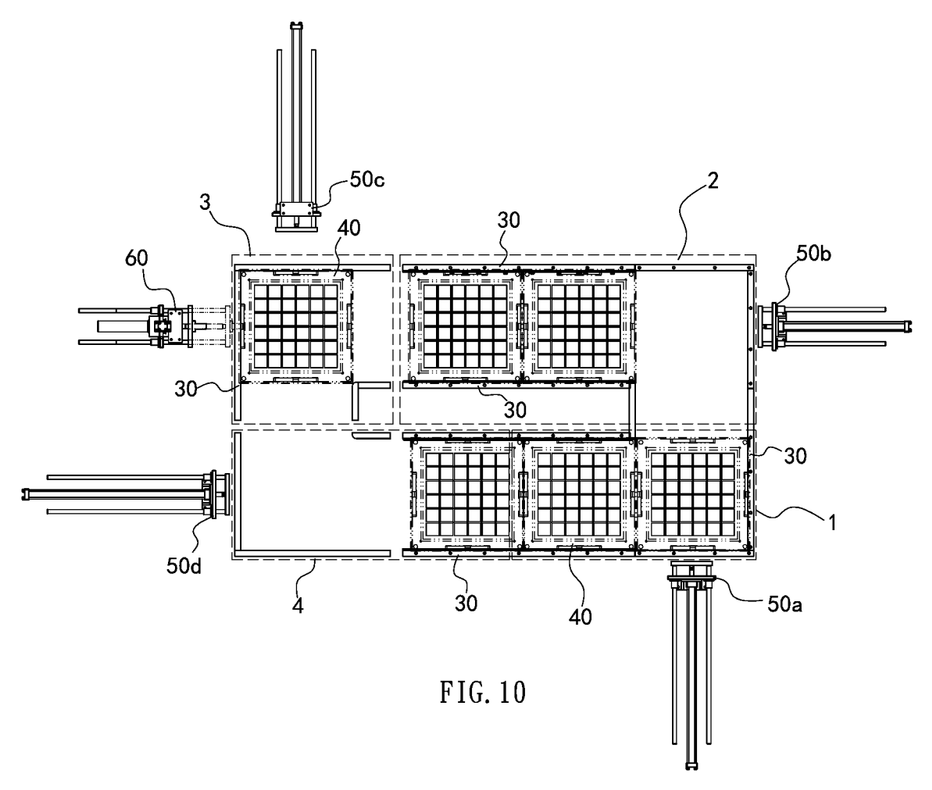
Figure 11:
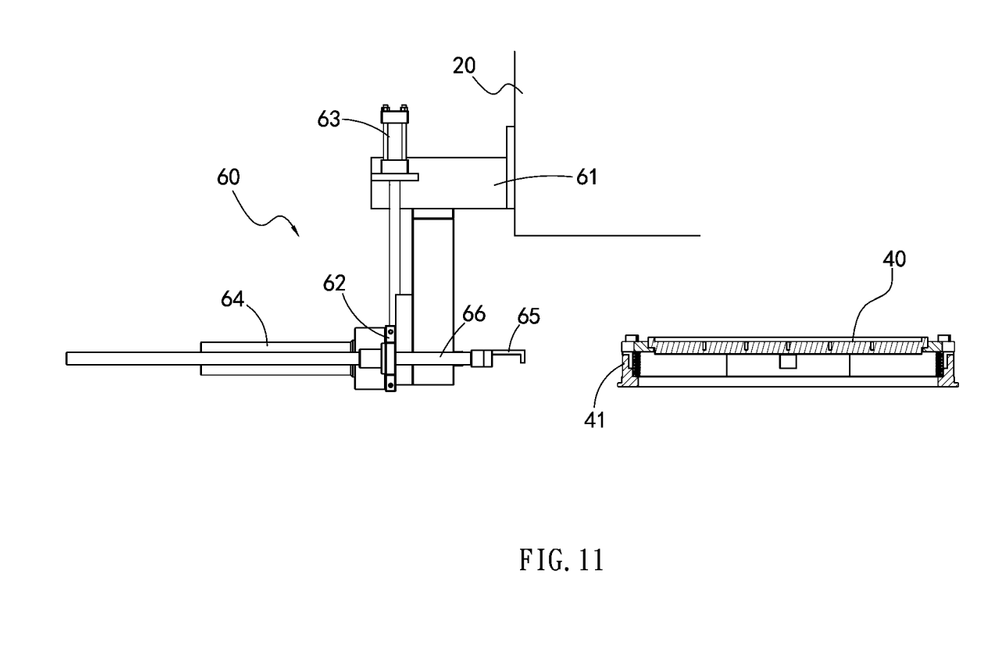
FIGS. 11 and 12 are a top plan view showing the operation of another part of the automated forming machine according to the preferred embodiment of the present invention.
Figure 12:
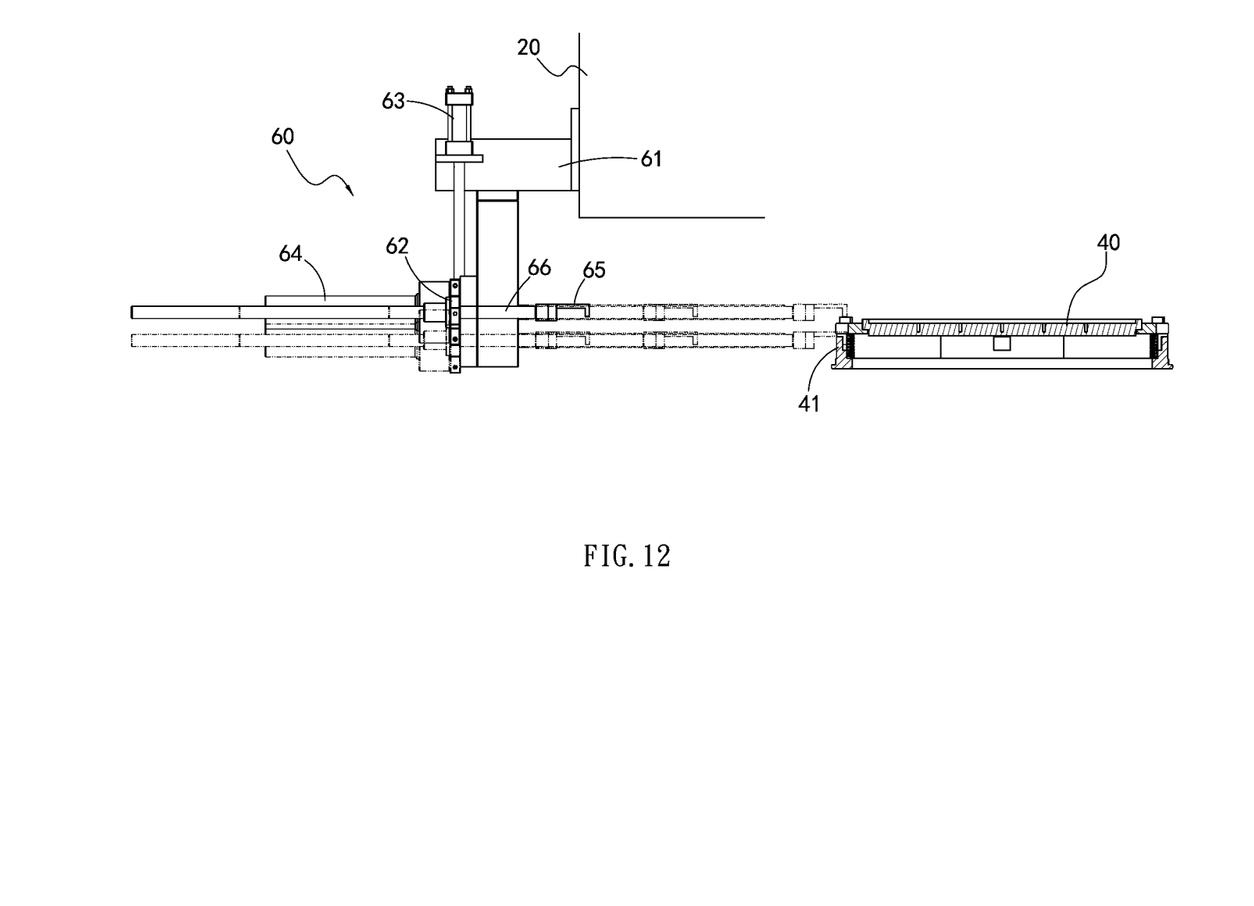

As shown in FIG. 10, after the plural loading carriers 40 in the heating zone 2 are pushed toward the forming zone 3, the pulling device 60 pulls the plural loading carriers 40 toward a forming position of the forming device 20, and then the plural loading carriers 40 move back to an original position, hence the forming device 20 clamps, heats, and blow molds the at least one metal sheet on the plural loading carriers 40.

Figure 1:
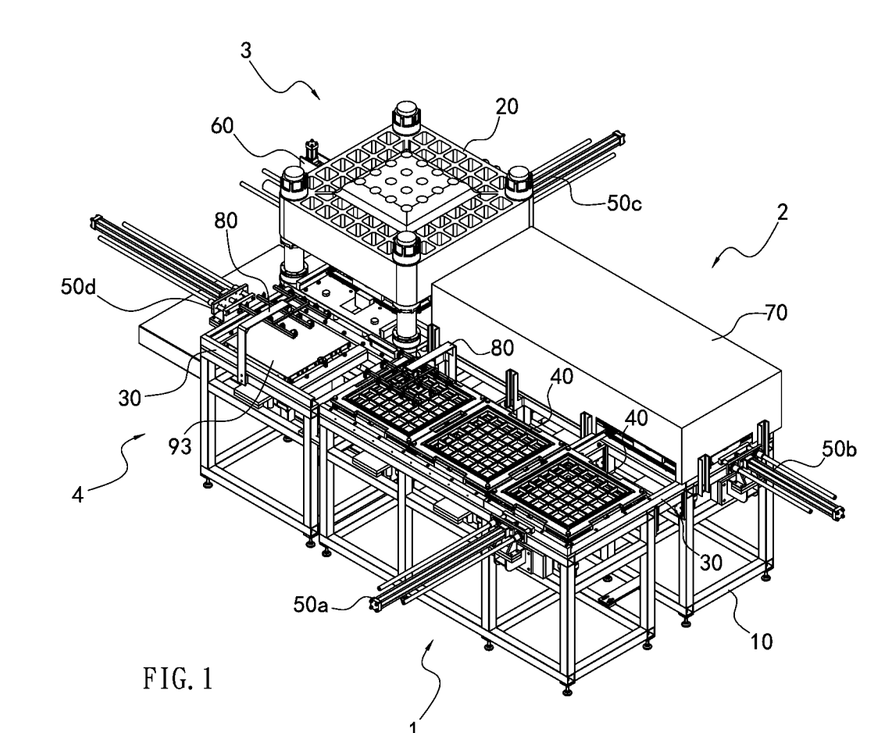
FIG. 1 is a perspective view showing the assembly of an automated forming machine according to a preferred embodiment of the present invention.
Figure 2:
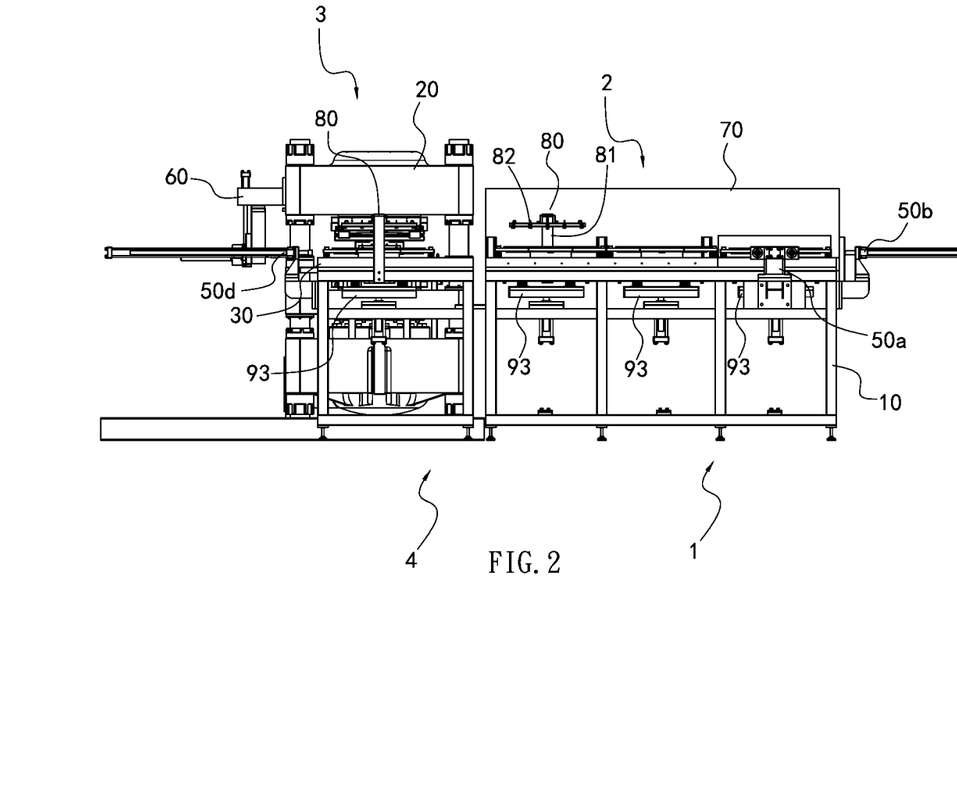
FIG. 2 is a front elevational view showing the assembly of the automated forming machine according to the preferred embodiment of the present invention.
Figure 3:
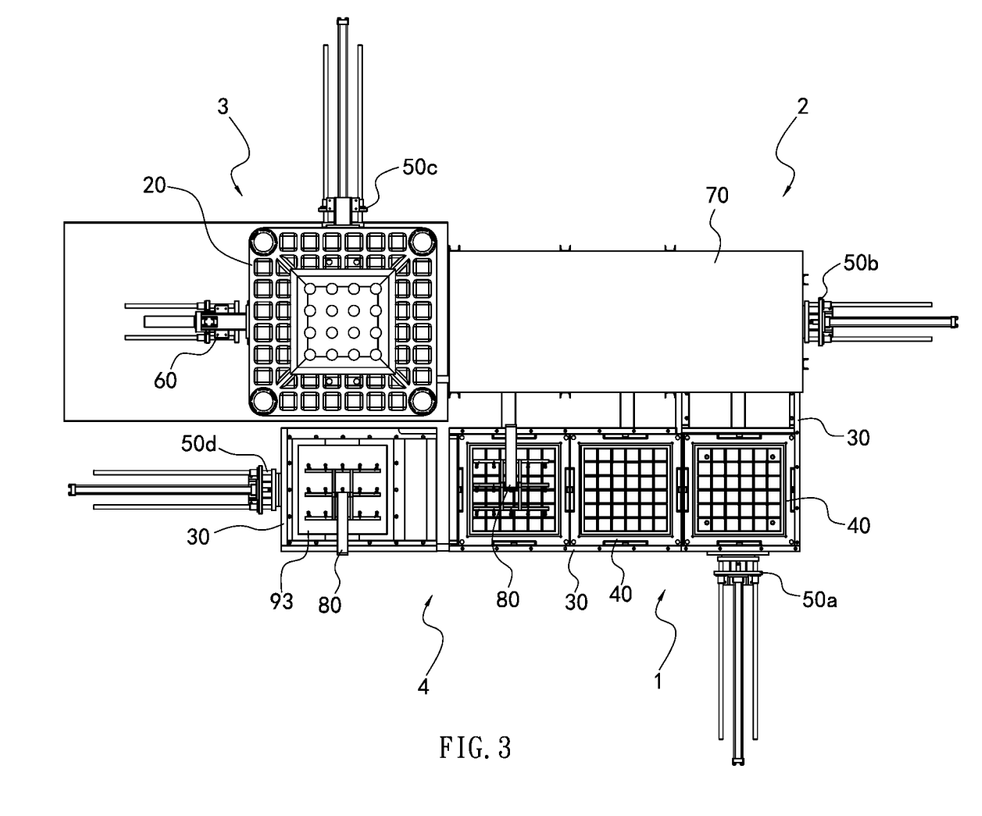
FIG. 3 is a bottom plan view showing the assembly of the automated forming machine according to the preferred embodiment of the present invention
Figure 4:
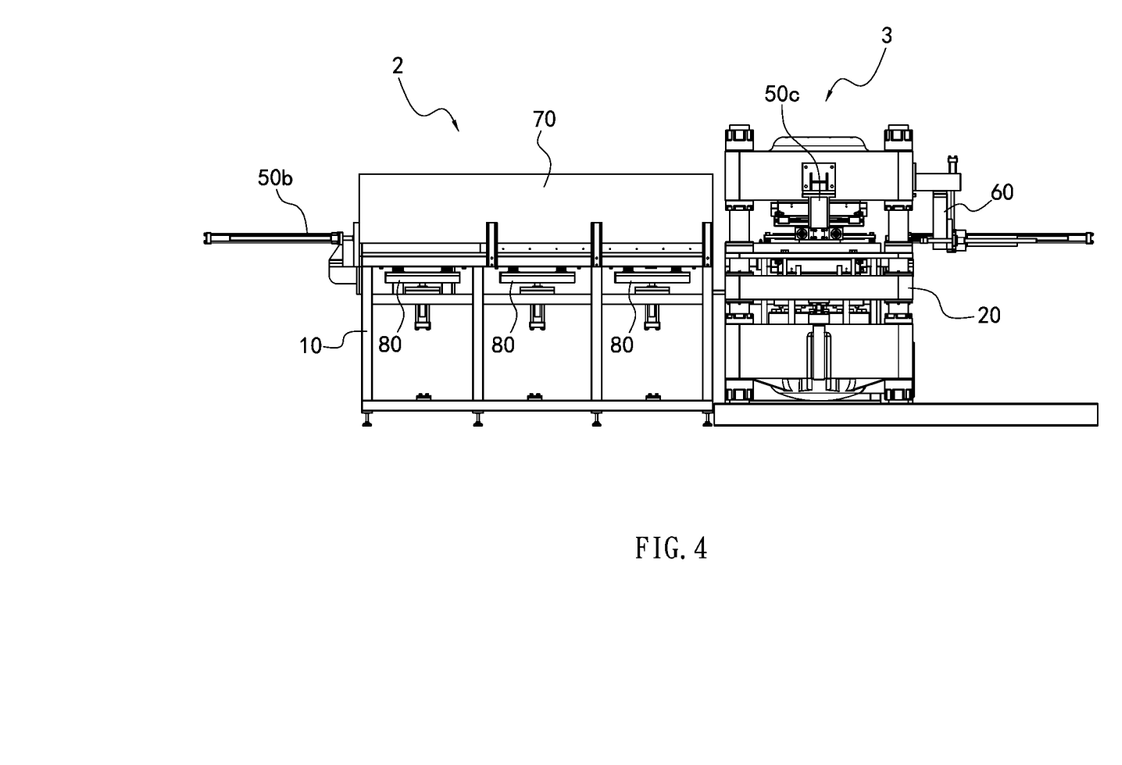
FIG. 4 is a rear elevational view showing the assembly of the automated forming machine according to the preferred embodiment of the present invention
Figure 5:
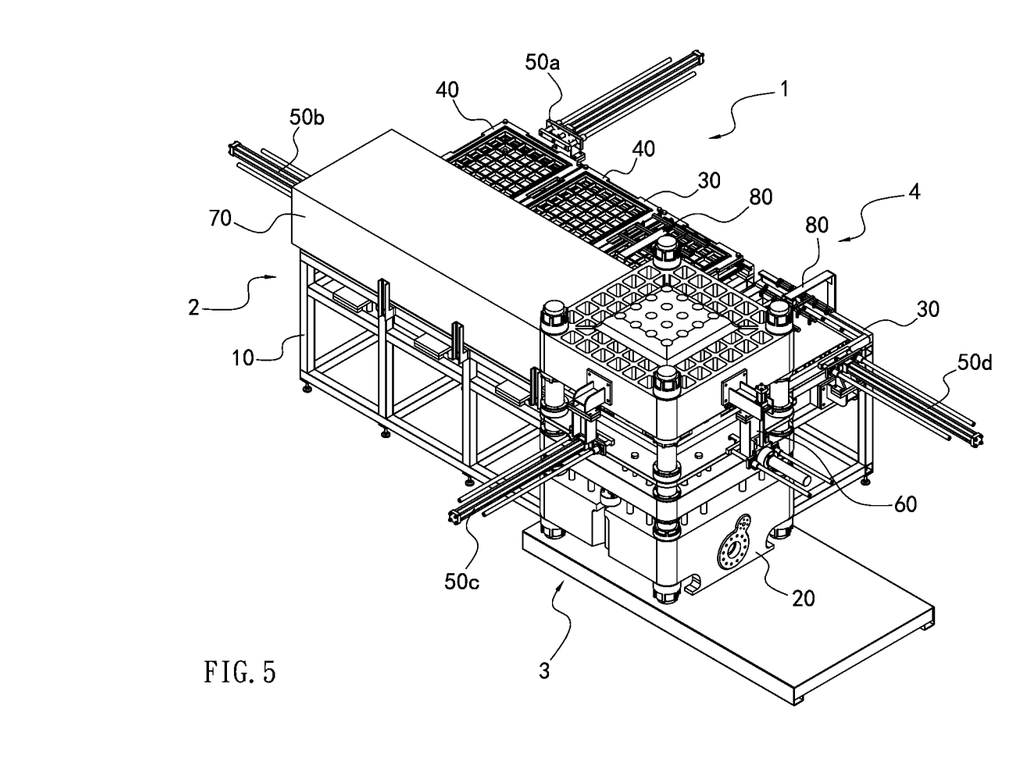
FIG. 5 is another perspective view showing the assembly of an automated forming machine according to the preferred embodiment of the present invention.
Figure 6:
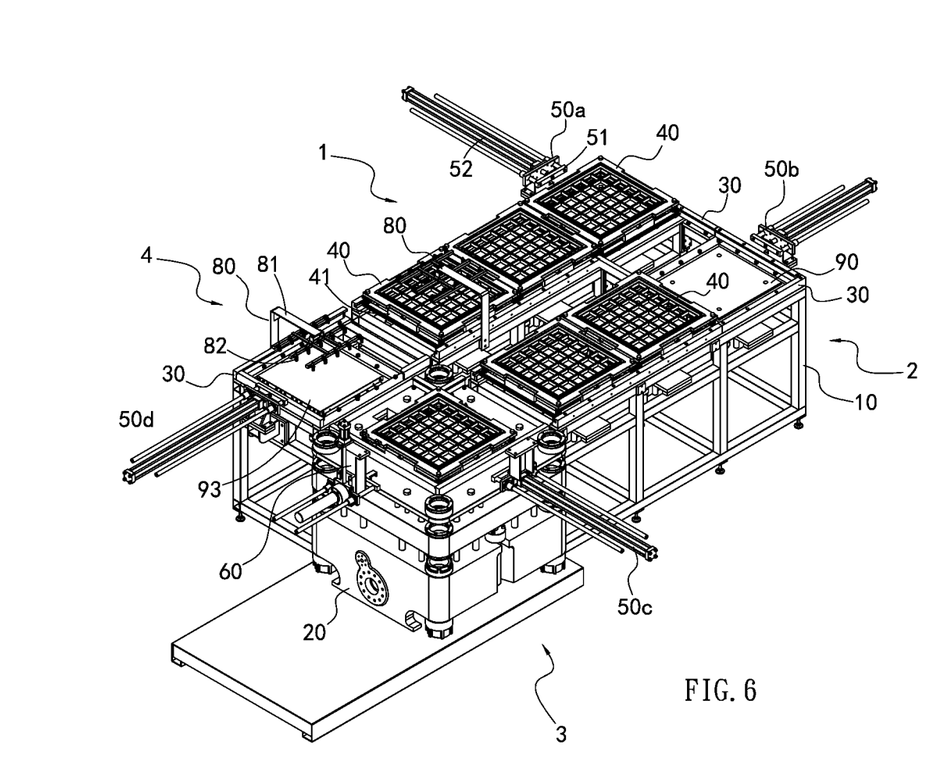
FIG. 6 is also another perspective view showing the assembly of the automated forming machine according to the preferred embodiment of the present invention.
Figure 7:
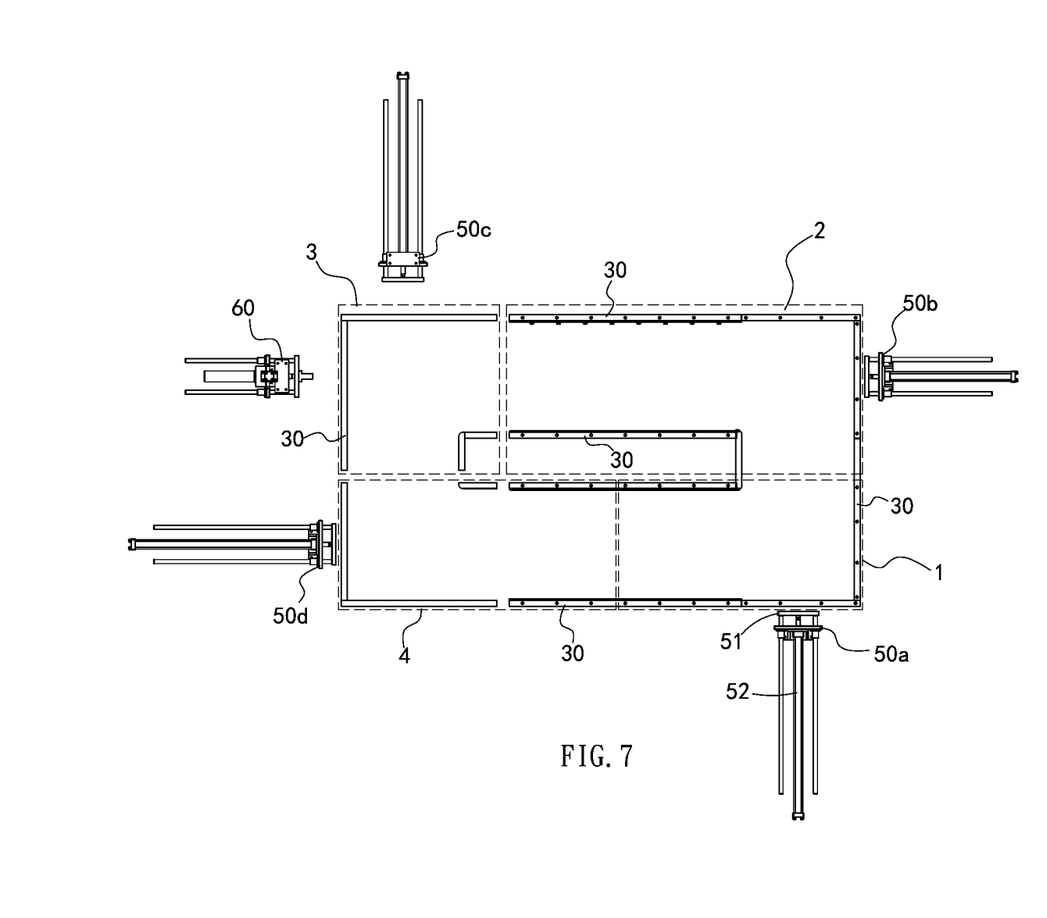
FIG. 7 is a top plan view showing the assembly of a part of the automated forming machine according to the preferred embodiment of the present invention.

As illustrated in FIGS. 6 and 7, each of the first pushing devices 50a, the second pushing device 50b, the third pushing device 50c and the fourth pushing device 50c has a push block 51 for pushing against one side of each of the plural loading carriers 40 and has a movable cylinder 52 for driving the push block 51 to move straightly, wherein the movable cylinder 52 is a hydraulic cylinder or a pneumatic cylinder.

With reference to FIGS. 1, 6, 11 and 12, the each loading carrier 40 has two hooking protrusions 41, and each hooking protrusion 41 is arranged on each of two sides of the each loading carrier 40. The pulling device 60 includes a fixed mount 61, a movable mount 62, a vertical cylinder 63, a horizontal cylinder 64, and a pull claw 65. The fixed mount 61 is mounted on the forming device 20, the movable mount 62 is movably fixed on the fixed mount 61, and the vertical cylinder 63 is arranged on the fixed mount 61 to drive the movable mount 62 to move vertically. The horizontal cylinder 64 is secured on the movable mount 62 and has a moving rod 66, and the pull claw 65 is disposed on an end portion of the moving rod 66 to hook the each hooking protrusion 41. Each of the vertical cylinder 63 and the horizontal cylinder 64 is a hydraulic cylinder or a pneumatic cylinder. Thereby, the vertical cylinder 63 and the horizontal cylinder 64 control the pull claw 65 to hook the each hooking protrusion 41, and the pull claw 65 pulls the plural loading carriers 40 toward the forming position and back to the original position.

Figure 13:
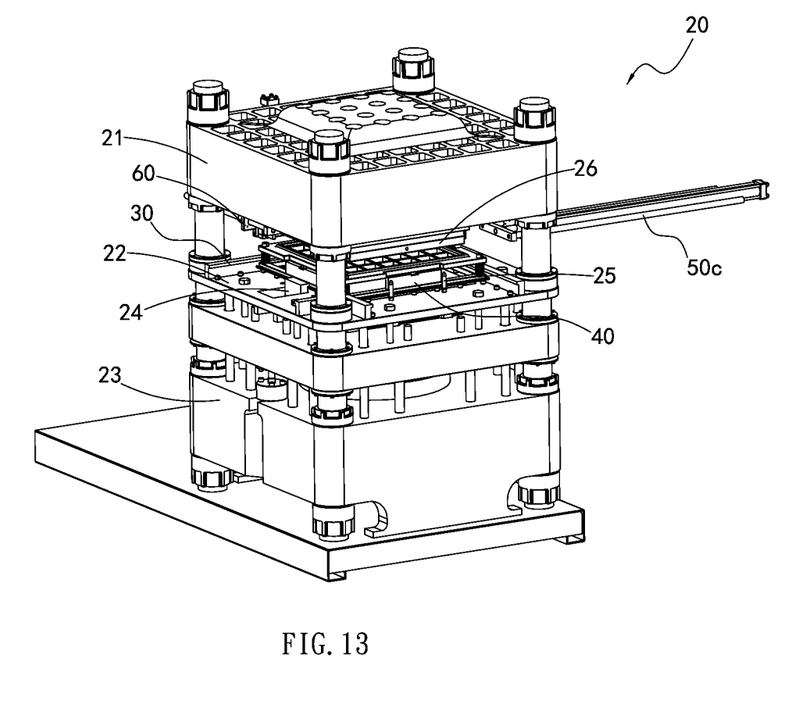
FIG. 13 is a perspective view showing the assembly of a part of the automated forming machine according to the preferred embodiment of the present invention.

Referring to FIG. 13, the forming device 20 includes a first holder 21, a lifter 22, a vertical moving machine 23, a positioning hook 24, and plural affix posts 25. The first holder 21 accommodates a closing mold 26 for supplying high-pressure gas in a blow molding process. The first holder 21 has a heater for heating the at least one metal sheet in a forming process. The lifter 22 is arranged below the first holder 21 to move vertically and has the plural tracks 30 arranged thereon to guide the plural loading carriers 40 to the forming position. The vertical moving member 23 is a hydraulic press and drives the lifter 22 to move vertically, such that the at least one module on the plural loading carriers 40 at the forming position and the closing mold 26 clamp, heat, and blow mold the at least one metal sheet. The positioning hook 24 is movably disposed on the lifter 22, and hence when the plural loading carriers 40 moves toward the forming position, the positioning hook 24 hooks the plural loading carriers 40. After the at least one metal sheet is formed, the positioning hook 24 moves below the lifter 22 so that the plural loading carriers 40 move toward the cooling zone 4 via the positioning hook 24. The plural affix posts 25 are movably mounted on the lifter 22, hence when the plural loading carriers 40 enter into the forming device 20 from the heating zone 2, the plural affix posts 25 retract into the lifter 22 to move the plural loading carriers 40, wherein when the plural loading carriers 40 move toward the forming position, the plural affix posts 25 extend out of the lifter 22 to abut against the plural loading carriers 40. The positioning hook 24 and the plural affix posts 25 position the plural loading carriers 40 at the forming position.

Figure 14:
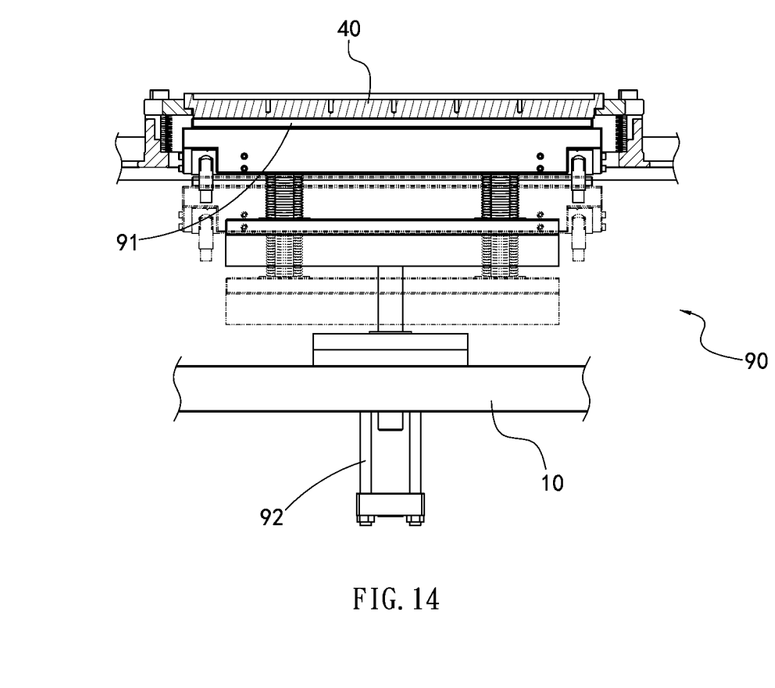
FIG. 14 is a side plan view showing the operation of another part of the automated forming machine according to the preferred embodiment of the present invention.

As shown in FIG. 14, each of the plurality of second heating devices 90 has a heating plate 91 and a driving cylinder 92, wherein the heating plate 91 is movably fixed in the frame 10, and the driving cylinder 92 drives the heating plate 91 to move vertically, such that the heating plate 91 contacts with a bottom of the at least module on the plural loading carriers 40. The heating plate 91 has a plurality of first pipes to flow hot water for heating the at least one module. The plurality of second cooling devices 93 have a structure the same as the plurality of second heating devices 90. Preferably, the plurality of second cooling devices 93 have a plurality of second pipes to flow cold water or condensed fluid, hence the heating plate is cooled to further cool the at least one module.

Figure 15:
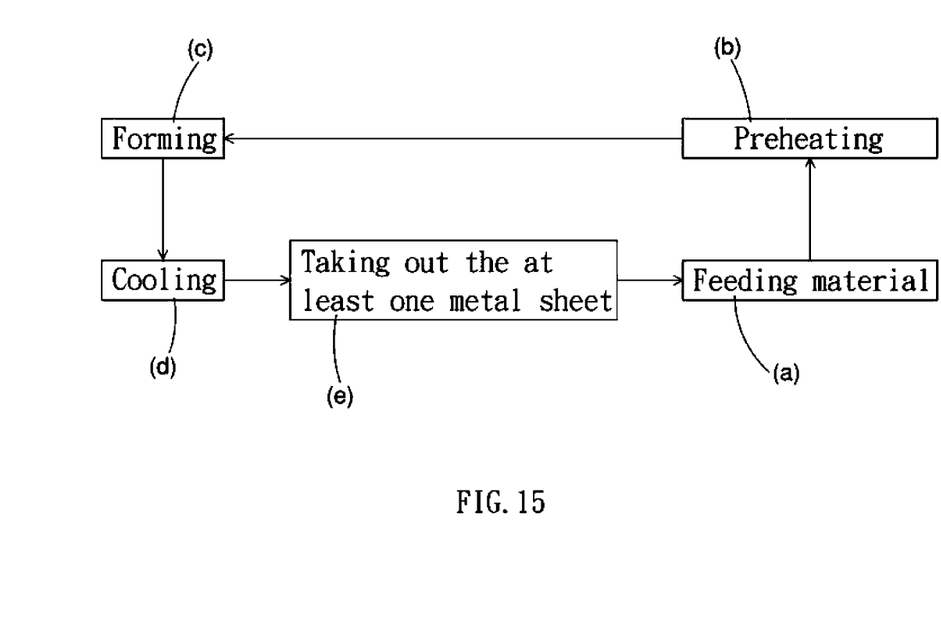
FIG. 15 is a block diagram of a method of forming at least one metal sheet by using an automated supplying forming machine according to the preferred embodiment of the present invention.

As illustrated in FIG. 15, a method of forming at least one metal sheet by using an automated supplying forming machine according to a preferred embodiment of the present invention comprise steps of:

(a) Feeding material, wherein at least one metal sheet is placed into at least one module on plural loading carriers 40 on a distal end of a material supplying zone 1;

(b) Preheating, wherein the plural loading carriers 40 are pushed toward a front end of a heating zone 2 by a first pushing device 50a from the distal end of the material supplying zone 1, a second pushing device 50b pushes the plural loading carriers 40 out of a forming zone 3 from a distal end of the heating zone 2, wherein when the plural loading carriers 40 are located in the heating zone 2, a first heating device 70 and a plurality of second heating devices 90 heat the at least one metal sheet on the plural loading carriers 40 to a desired temperature;

(c) Forming, wherein a pulling device 60 pulls the plural loading carriers 40 toward a forming position of a forming device 20, and the forming device 20 clamps, heats, and blow molds the at least one metal sheet on the plural loading carriers 40;

(d) Cooling, wherein a third pushing device 50c pushes the plural loading carriers 40 in the forming device 20 toward a front end of a cooling zone 4 so that one of two cooling devices 80 and a plurality of second cooling devices 93 cool the at least one metal sheet on the plural loading carriers 40, and the third pushing device 50c pushes the plural loading carriers 40 on the front end of the cooling zone 4 toward a rear end of the cooling zone 4 so that the other of the two cooling devices 80 and the plurality of second cooling devices 93 cool the at least one metal sheet on the plural loading carriers 40, wherein the two cooling devices 80 spray cooling air, cooling mist or coolant to the at least one metal sheet on the plural loading carriers 40, thus removing the at least one metal sheet from the at least one module quickly;

(e). Taking out the at least one metal sheet, wherein a fourth pushing device 50s pushes the plural carriers 40 toward a front end of the material supplying zone 1 from the distal end of the cooling zone 4 so that the at least one metal sheet are taken out.

Thereby, the at least one metal sheet is fed, preheated, formed, cooled, and taken out automatically to enhance forming efficiency.

Preferably, the plural loading carriers 40 are heated and cooled upwardly and downwardly to accelerate heating and cooling time. The plurality of spray nozzles 82 are fixed on the support rack 81 and spray the cooling air, the cooling mist or the coolant to the at least one metal sheet on the plural loading carriers 40, such that the at least one metal sheet removes from the at least one module quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An automated forming machine being adapted to form at least one metal sheet and comprising: a material supplying zone, a heating zone, a forming zone, and a cooling zone which are all configured to accommodate components of the automated forming machine, wherein the components of the automated forming machine includes:

a frame configured in the material supplying zone, the heating zone and the cooling zone;

a forming device disposed in the forming zone to clamp, heat, and blow mold the at least one metal sheet;

plural tracks configured on the frame and the forming device in a quadrilateral arrangement;

plural loading carriers loading at least one module on which the at least one metal sheet is fixed, such that the plural loading carriers deliver the at least one module and the at least one metal sheet along the plural tracks in a quadrilateral carrying path;

each of a first pushing device, a second pushing device, a third pushing device and a fourth pushing device mounted in each of four first dies of the material supplying zone, the heating zone, the forming zone and the cooling zone to push the plural loading carrier toward any one of the material supplying zone, the heating zone, the forming zone, and the cooling zone;

a pulling device arranged on a second end of the forming zone and disposed on the forming device, such that the plural loading carriers are pushed by the second pushing device toward the forming zone and are pulled toward a forming position of the forming device;

a first heating device mounted in the heating zone and located above the plural tracks, such that the plural loading carriers move across a bottom of the first heating device, and the at least one metal sheet on the plural loading carriers is heated to the desired temperature;

two cooling devices secured in the cooling zone, and each cooling device including a support rack and a plurality of spray nozzles, wherein the support rack is coupled with the frame and extends to a top of each of the plural tracks, the plurality of spray nozzles are fixed on the support rack and spray cooling air, cooling mist or coolant to the at least one metal sheet on the plural loading carriers, such that the at least one metal sheet is removed from the at least one module quickly.

2. The automated forming machine as claimed in claim 1 further comprising a plurality of second heating devices and a plurality of second cooling devices, wherein the plurality of second heating devices are disposed in the heating zone and on the frame, and they are located below the plural tracks, such that the plural loading carriers move across the plurality of second heating devices, and the at least one module on the plurality of second heating devices is heated by the plurality of second heating devices, hence the at least one metal sheet on the plural loading carriers is heated by the plurality of second heating devices; the plurality of second cooling devices are disposed in the cooling device and the material supplying zone and on the frame, and they are located below the plural tracks, such that the at least one module on the plural loading carriers is cooled to indirectly cool the at least one metal sheet on the plural loading carriers.

3. The automated forming machine as claimed in claim 2, wherein each of the plurality of second heating devices has a heating plate and a driving cylinder, the heating plate is movably fixed in the frame, and the driving cylinder drives the heating plate to move vertically, such that the heating plate contacts with a bottom of the at least one module on the plural loading carriers; the heating plate has a plurality of first pipes to flow hot water for heating the at least one module.

4. The automated forming machine as claimed in claim 2, wherein the plurality of second cooling devices have a plurality of second pipes to flow cold water or condensed fluid, hence the heating plate is cooled to further cool the at least one module.

5. The automated forming machine as claimed in claim 2, wherein the material supplying zone, the heating zone, the forming zone, and the cooling zone are configured in a quadrilateral arrangement.

6. The automated forming machine as claimed in claim 2, wherein each of the first pushing device, the second pushing device, the third pushing device and the fourth pushing device has a push block for pushing against one side of each of the plural loading carriers and has a movable cylinder for driving the push block to move straightly.

7. The automated forming machine as claimed in claim 2, wherein the each loading carrier has two hooking protrusions, and each hooking protrusion is arranged on each of two sides of the each loading carrier; the pulling device includes a fixed mount, a movable mount, a vertical cylinder, a horizontal cylinder, and a pull claw; the fixed mount is mounted on the forming device, the movable mount is movably fixed on the fixed mount, and the vertical cylinder is arranged on the fixed mount to drive the movable mount to move vertically, the horizontal cylinder is secured on the movable mount and has a moving rod, and the pull claw is disposed on an end portion of the moving rod to hook the each hooking protrusion.

8. The automated forming machine as claimed in claim 2, wherein the forming device includes a first holder, a lifter, and a vertical moving machine; the first holder accommodates a closing mold for supplying high-pressure gas in a blow molding process; the first holder has a heater for heating the at least one metal sheet in a forming process; the lifter is arranged below the first holder to move vertically and has the plural tracks arranged thereon to guide the plural loading carriers to the forming position; the vertical moving member drives the lifter to move vertically, such that the at least one module on the plural loading carriers at the forming position and the closing mold lamp, heat, and blow mold the at least one metal sheet.

9. The automated forming machine as claimed in claim 8, wherein the forming device further includes a positioning hook and plural affix posts; the positioning hook is movably disposed on the lifter, hence when the plural loading carriers moves toward the forming position, the positioning hook hooks the plural loading carriers; after the at least one metal sheet is formed, the positioning hook moves below the lifter so that the plural loading carriers move toward the cooling zone via the positioning hook; the plural affix posts are movably mounted on the lifter, hence when the plural loading carriers enter into the forming device from the heating zone, the plural affix posts retract into the lifter to move the plural loading carriers, wherein when the plural loading carriers move toward the forming position, the plural affix posts extend out of the lifter to abut against the plural loading carriers, and the positioning hook and the plural affix posts position the plural loading carriers at the forming position.

10. The automated forming machine as claimed in claim 8, wherein the vertical moving member is a hydraulic press.

* * * * *